United States Patent [19]
Demaray

[11] 3,820,713
[45] June 28, 1974

[54] MULTIPLE ZONE AIR CONDITIONING SYSTEM

[75] Inventor: Merlin E. Demaray, Columbus, Ohio

[73] Assignee: Ranco Incorporated, Columbus, Ohio

[22] Filed: June 8, 1973

[21] Appl. No.: 368,221

Related U.S. Application Data

[62] Division of Ser. No. 203,329, Nov. 30, 1971.

[52] U.S. Cl. .................. 236/1 E, 165/22, 236/49
[51] Int. Cl. ..................... F24d 5/00, F24f 11/08
[58] Field of Search ....... 165/22; 236/1 E, 1 C, 1 B, 236/49; 307/39; 237/2 A

[56] References Cited
UNITED STATES PATENTS

3,567,115  12/1970  Nelson .......................... 165/22
3,623,545  11/1971  Pinckaers ....................... 236/1 E Primary Examiner—William E. Wayner
Attorney, Agent, or Firm—Watts, Hoffmann, Fisher & Heinke Co.

[57] ABSTRACT

A multiple zone air conditioning system is disclosed having a control system in which heating or cooling equipment is controlled according to the maximum and minimum zone air conditioning loads. The control system is constructed using electronic components which are protected against damage due to improper installation.

8 Claims, 4 Drawing Figures

MULTIPLE ZONE AIR CONDITIONING SYSTEM

This is a division of application Ser. No. 203,329, filed 11/30/71.

CROSS REFERENCED COMMON ASSIGNED APPLICATIONS

U.S. Pat. application Ser. No. 87,963, filed Nov. 8, 1970 entitled METHOD & SYSTEM FOR CONTROLLING AIR TEMPERATURE IN AN AIR CONDITIONING ZONE, by Russell G. Attridge, Jr.

U.S. Pat. application Ser. No. (attorney's docket 168,596) entitled HYDRAULIC ACTUATOR by Robert E. Brooks and Robert T. Marks.

BACKGROUND OF THE INVENTION

1. Field of the Invention

The present invention relates to air conditioning systems and more particularly relates to air conditioning systems for supplying heated or cooled air to a plurality of air conditioned zones.

2. The Prior Art

Air conditioning systems for heating and/or cooling multiple zone buildings have been proposed in which the air heating and cooling equipment is part of a self-contained unit. One or more of these units are situated within or adjacent the building and air is delivered to the zones through ducts. In order to assure compatibility of the air conditioning units and control systems which govern their operation it has been proposed to provide factory installed control systems in the units and to employ compatible thermostatic sensors in the zones and/or in ducts associated with the zones.

Multiple zone air conditioning systems have employed controls which govern operation of air heating or air cooling apparatus in accordance with the maximum sensible air conditioning load present in any one of the zones. The magnitude of the sensible air conditioning load in any zone is a function of the difference between a set point temperature for the zone and the sensed air temperature in the zone. In such systems the maximum air conditioning load is indicated by some sort of signal, mechanical or electrical, which has a maximum or a minimum value when compared to the signals from all other zones.

Some prior art systems of the type referred to employed electrically operated apparatus for governing operation of air heating or air cooling equipment in response to output signals from electrical temperature responsive circuits. The circuits were constructed so that when all zones were at or close to the system set point temperature a null or no signal condition existed. If zone temperatures increased above the set point level, a signal was produced in proportion to the highest sensed zone air temperature. If zone temperatures decreased below the set point temperature a signal of opposite polarity was produced in proportion to the deviation between the temperature sensed in the coolest zone and the set point temperature. Thus, when the air temperatures in all zones were either above or below the set point temperature, the air conditioning equipment responded only to the demand of the most heavily loaded zone. Load signals from the remaining zones had no effect on the equipment and were thus, in effect, disregarded.

Controlling the air conditioning systems with such controls usually entailed cycling the heating or cooling equipment and produced corresponding fluctuations in the zone temperatures. In installations employing electric resistance heating units for heating air ducted into the zones, heater cycling tended to maximize the energy consumption of the heaters in satisfying the demand from the coldest zone. This tended toward relatively high system operation costs due to the electrical energy consumption attendant their usage. Moreover, the heat produced was sometimes excessive for zones having relatively small heating loads.

The same situation obtained when all zones were at temperatures greater than the set point level, and refrigeration units were operated to cool the zones.

Control systems of the types referred to have sometimes been constructed so that they were difficult to install properly and malfunctions in system components were not readily detected, diagnosed and serviced. Generally, the zone air temperature sensor units and the air conditioning units are installed at different stages of the building construction. This requires completion of the wiring between the air conditioning units and the temperature sensor units when all components of the air conditioning system have been installed. In control systems employing electronic components, it has been possible to improperly wire the zone sensor units and the air conditioning units together which has caused malfunctions in the control systems. In some situations, improper wiring leads to destruction of some of the electronic components. Furthermore, malfunctions have been difficult to discover and diagnose which has lead to frequent service calls and unsatisfactory performance of the air conditioning equipment.

SUMMARY OF THE INVENTION

The present invention provides a new and improved control system for a multiple zone central air conditioning system which is effective to enable operation of the air conditioning system according to the demands for conditioned air from the zones having both the greatest and the smallest air conditioning loads. The new system also enables zone sensor units to be wired into the system with minimal risk of damage to electronic components as a result of improper wiring. The new system further enables the existence and locations of certain types of malfunctions and improper wiring connections between zone sensor units and associated control system components to be quickly discovered. In its preferred form, the new system is employed in a multiple zone building which is provided with an air conditioning system for heating and/or cooling air directed to zones in the building. The air conditioning system includes a blower, air heating equipment and air cooling equipment. The air cooling equipment is preferably constructed to provide multiple stages of air cooling heat exchangers. The air heating equipment is likewise constructed to provide multiple stages of air heating heat exchangers.

The new control system comprises controller units for the air heating and cooling equipment and zone sensor units governing operation of the controller units. Each stage of the air heating and air cooling equipment is operated by a respective voltage responsive controller unit. The controller units are operated by analog condition dependent command signals produced by the zone sensor units associated with respective ones of the zones.

The magnitude of the command signal produced by a given zone sensor unit is, in general, proportional to the air conditioning load on the zone. When a zone is at or close to a zone set point temperature, the command signal produced by the respective sensor unit is ineffective to operate any heating or cooling equipment controllers. When the zone temperature varies a predetermined amount from the set point level the command signal level changes and causes operation of a heating controller or a cooling controller depending on the sense direction of the zone temperature change relative to the set point temperature.

The individual controller units are responsive to different command signal voltage levels so that the cooling or heating equipment is operated in stages as a command signal voltage varies proceeding away from the set point voltage signal level in a positive or a negative sense respectively.

An important feature of the invention resides in the construction and arrangement of the system to enable the command signals from each zone to be continuously compared and wherein both the maximum command signal and the minimum command signal are continuously applied to appropriate controller units. The command signals are direct current signals which are of the same polarity with respect to a reference voltage (e.g. positive with respect to ground) and which can vary in a positive or negative sense relative to desired zone set point voltage levels. Hence, there is no "null" or zero command voltage level which corresponds to a set point temperature level.

By continuously utilizing both the maximum and minimum zone sensor command signals, it is possible to provide cooling for zones having air temperatures above a set point level while simultaneously heating zones having air temperatures below the set point level. Furthermore, when all the zones are above or below the set point level, control of the cooling or heating equipment, respectively, is accomplished using both the minimum and maximum command signals.

Controlling the air conditioning equipment according to both the highest and lowest zone signals, when all zones are above or below set point temperatures, reduces cycling of the heating or cooling equipment and tends to reduce temperature fluctuations in all the zones. As an example, the new control system enables operation of a stage of the heating equipment in response to the command signal from the most lightly loaded zone when all zones are close to but below the set point temperature level. This stage of the heating equipment is preferably a relatively small capacity secondary or auxiliary type heater which provides a relatively low level of heat input to all the zones thus tending to balance the heating loads in all zones. If the air temperature in one or more zones decreases a predetermined amount below the set point temperature, one or more additional stages of the primary heating equipment will respond to the command signal from the coldest zone so that air supplied to all zones is heated according to the requirements of the coldest zone.

The secondary heater stage of the heating equipment continues to be responsive to the load in the warmest zone. Hence, where the secondary heater stage controlled by the warmest zone provides a low cost source of heat, e.g. an oil or gas fired furnace, a source of waste heat from the building, or a relatively low capacity electric resistance heater, the air directed to all zones is heated in part by the low cost heat source operated by the command signal from the warmest zone. This reduces cycling of high operating cost heating equipment, such as larger electric resistance heaters, while retaining the advantages of such systems, i.e. quick response, ease of installation and cleanliness.

The operation of the control system when cooling is required by all zones is analogous to operation on the heating cycle. The low cost cooling source could be provided by a relatively small capacity mechanical refrigeration unit or cooling tower water, for example.

Another important feature of the invention resides in the construction of a multizone temperature control system which, if improperly installed, protects components of the system from damage due to the improper installation as well as enabling relatively rapid diagnosis and correction of the installation errors. The new system employs electronic components which are connected to a regulated D.C. power supply. The circuitry providing the command signals includes a diode connected between its power input terminals. When the command signal circuitry is properly wired to the power supply, the diode is biased to a nonconducting condition by the power supply. However, when the signal circuitry power input terminals are improperly connected to the power supply, the diode conducts and shunts the signal circuitry. This prevents electronic components in the signal circuitry from being damaged due to the reverse polarity connections since the voltage across such components is limited to the forward voltage drop across the diode.

Another feature resides in the power supply circuitry which is constructed so that when the current load across the output is substantially increased, e.g. when a diode in the command signal circuitry conducts due to improper wiring, the power supply output is substantially reduced. Hence, if any of the command signal circuits are improperly connected to the power supply the power supply output is ineffective to operate the system and this fact is readily apparent to the equipment installer. The proper wiring connections can then be made without damage to the system components.

During operation of the system, it any components of the signal circuits or controller circuits malfunction or fail in such a way that the current load on the power supply is substantially increased, for example due to a short circuit, the power supply output voltage is reduced and the system ceases to operate. To service the system, individual circuits are successively disconnected from the power supply. When the circuit containing the malfunctioning component is disconnected, the proper power supply voltage and current are reestablished and the control system is reactivated. The malfunctioning circuit is thus identified and can be repaired or replaced.

Other features and advantages of the invention will become apparent from the following detailed description made with reference to the accompanying drawings which form a part of the specification.

DESCRIPTION OF A PREFERRED EMBODIMENT

Figure 1:
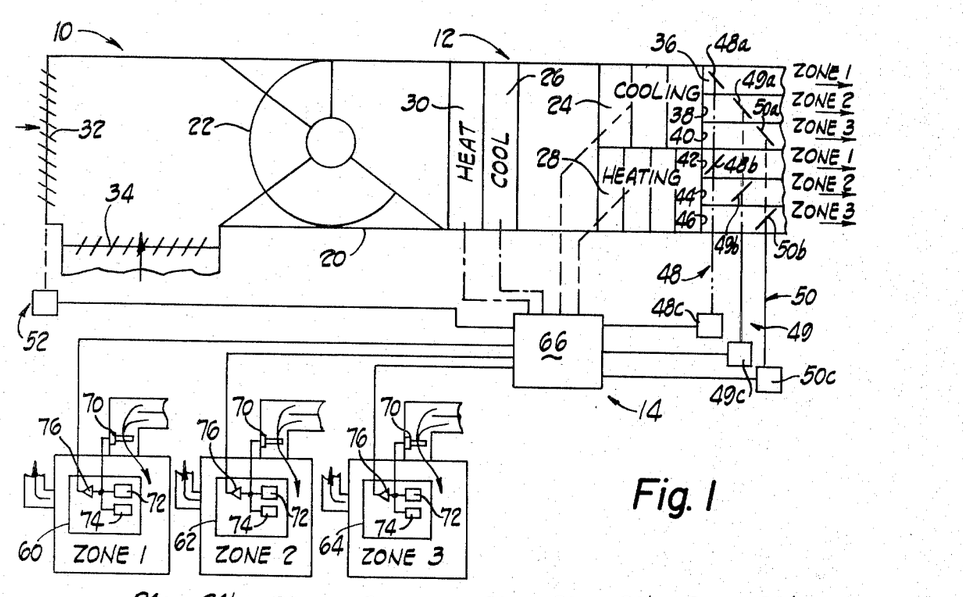
FIG. 1 is a schematic view of an air conditioning system embodying the present invention.

An air conditioning system 10 for a multiple zone building is illustrated in FIG. 1 of the drawings. The system 10 comprises air conditioning equipment, generally designated at 12, for supplying conditioned air to zones 1-3 in the building under the governance of a control system 14.

The air conditioning equipment 12 is effective to heat and/or cool air directed to the building and may take the form of a rooftop type heating and cooling unit. The equipment 12 is contained in the housing 20 and comprises a blower 22, air chilling heat exchanger units 24, 26 and air heating heat exchanger units 28, 30. The housing 20 defines an outside air inlet 32 and a return air inlet 34 through which air is drawn into the housing by the blower 22. Air moving through the housing passes across the heat exchangers so that temperature conditioned air is directed from the housing 20 through chilled air outlets 36, 38, 40 which communicate with zones 1-3 respectively and heated air outlets 42, 44, 46 which also communicate with the zones 1-3, respectively. Zone air damper units 48-50 are located in the heated and chilled outlets and are actuable to control the quantities of heated and/or chilled air flowing to any particular zone. A damper unit 52 is also associated with the outdoor air inlet and the return air inlet for governing the proportions of return and ventilation air circulating through the zones.

THE HEATING AND COOLING EQUIPMENT

Figure 2:
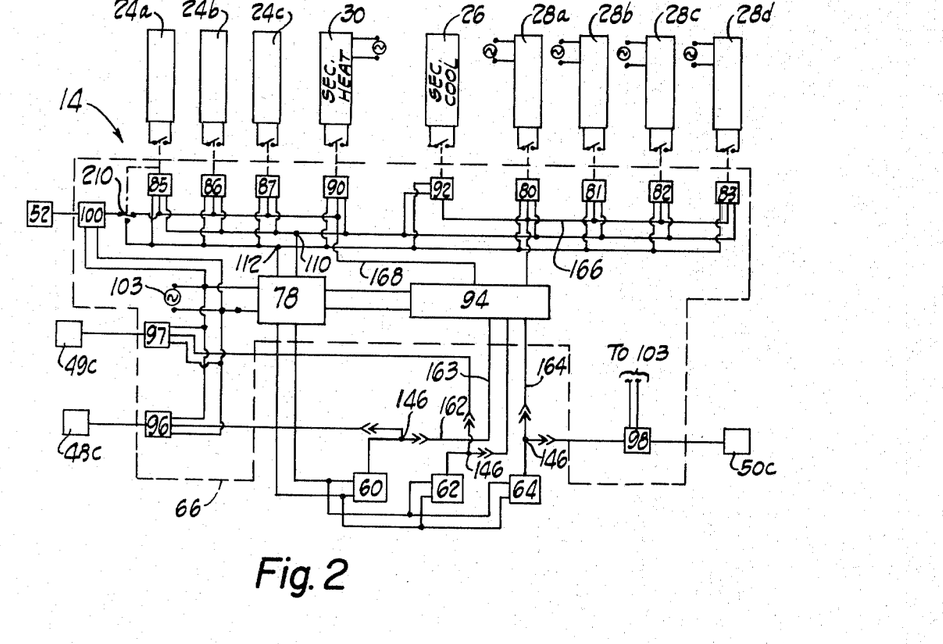
FIG. 2 is a schematic view of a part of the air conditioning system shown in FIG. 1.

In the illustrated embodiment, multiple stages of heating and cooling are provided. Referring now to FIG. 2, the air cooling heat exchanger unit 24 comprises three separate air cooling heat exchangers 24a, 24b, 24c which are individually operable. The heat exchangers 24a-c are preferably defined by evaporators of conventional compressor-condenser-evaporator refrigeration units which have not been illustrated. The air cooling heat exchanger unit 26 is, for convenience, referred to as a secondary heat exchanger and is illustratd as a single stage unit providing a low cost source of cooling. The unit 26 is preferably a relatively small compressor-condenser-evaporator refrigeration unit, schematically shown, but may be a suitable fin-tube heat exchanger in which cooling tower water circulates.

The heat exchanger unit 28 includes four separate air heating heat exchangers 28a-d each of which is individually operable so that the amount of heat transferred into air passing through the unit 28 can be varied stepwise according to the number of heater stages which are energized. The heating stages are each preferably electrical resistance heaters however other suitable sources of heat can be provided. The heat exchanger unit 30 is, for convenience, referred to as a secondary heater and provides relatively low cost source of heat. For example, the heat could be provided by process steam or the unit could be formed by a heat exchanger of a conventional oil or gas fired furnace in the building. This unit is illustrated as a relatively small electric resistance heater.

THE CONTROL SYSTEM

The control system 14 is constructed and arranged so that most of the components of the control system may be constructed integrally with the housing 20 and hence can be supplied by the equipment manufacturer as factory installed components. The remaining components of the control system are associated with the individual zones.

In the illustrated embodiment, the control system 14 includes zone temperature sensing units 60, 62, 64 disposed in the zones 1-3, respectively, and a control assembly 66 located with the air conditioning equipment 12 remote from the zones. The zone sensing units are wired to the components of the assembly 66 when the equipment 12 is installed in the building.

The control assembly 66 comprises a regulated D.C. power supply 78 for the control system 14, controllers for the various heat exchanger units, and logic circuitry for applying command signals from the zones to the controller units. Referring now to FIG. 2, the control assembly 66 includes voltage responsive heater controllers 80-83 for the heater stages 28a-d, respectively, voltage responsive refrigeration unit controllers 85-87 for the cooling stages 24a-c, a voltage responsive secondary heater controller 90 for the secondary heater 30 and a voltage responsive secondary cooling controller 92 for the secondary cooler 26. Command signals from the zone sensing units are distributed to appropriate controllers through logic circuitry generally designated at 94. The housing 66 also includes voltage responsive damper actuator controllers 96-98 which control the zone damper units 48-50, respectively, and a voltage responsive damper actuator controller circuit 100 for controlling the ventilation damper unit 52.

THE POWER SUPPLY

Figure 3:
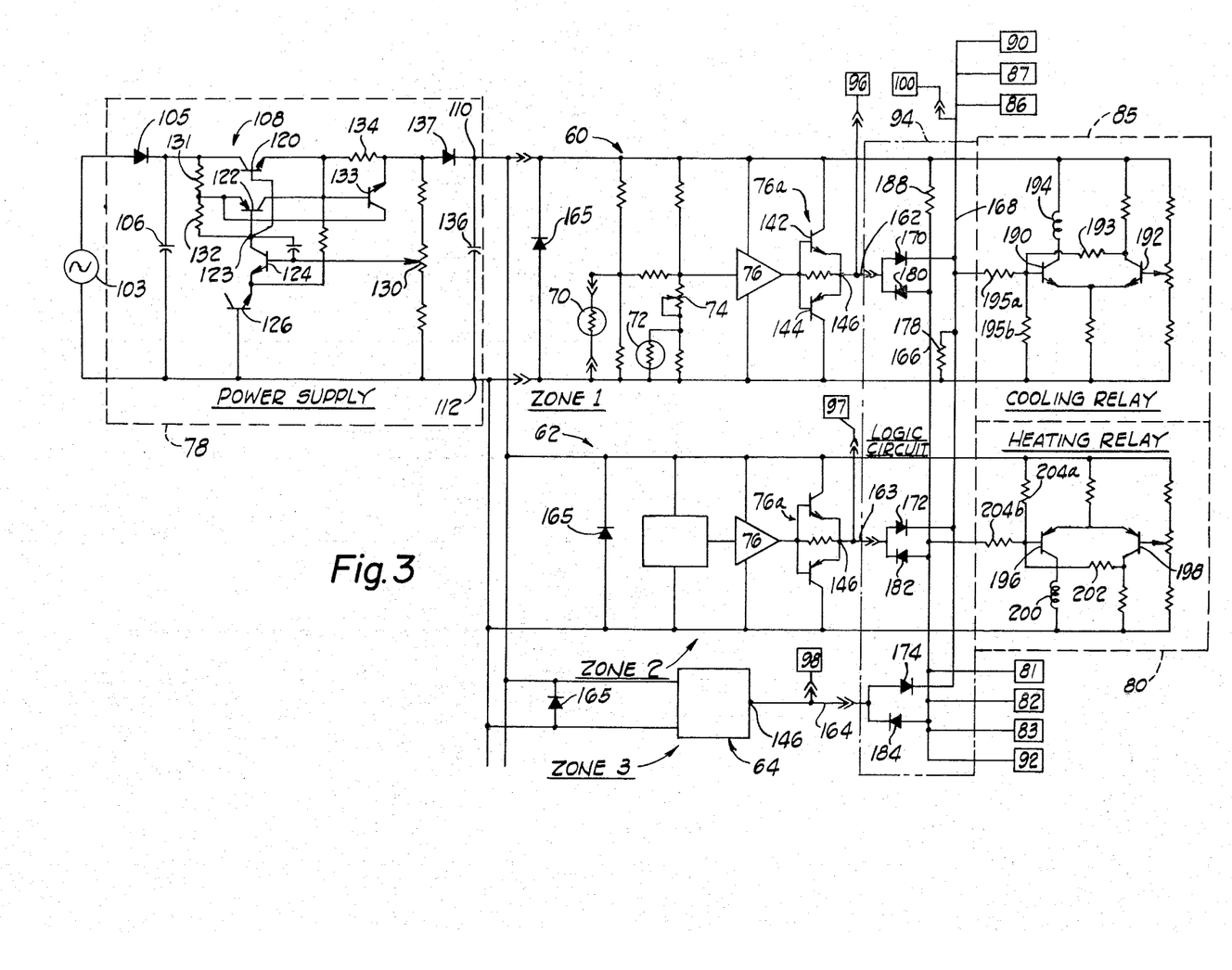
FIG. 3 is a schematic diagram of part of an electrical control system for the air conditioning system; and, FIG. 4 is a graphic illustration depicting operation of the system.

The regulated D.C. power supply 78 is illustrated in FIG. 3. The power supply 78 is preferably connected across a relatively low voltage A.C. power supply 103, e.g. 24 V.A.C., which is provided by the secondary winding of a conventional step-down transformer, not illustrated. A rectifier is formed by a diode 105 and capacitor 106 which cooperate to provide rectified filtered direct current.

A regulator circuit 108 is connected across the rectifier to smoothen the output voltage from the rectifier and provides a closely regulated substantially steady state direct current power supply output across power supply output terminals 110, 112. The preferred regulator circuit comprises transistors 120, 122 which cooperate to smoothen the output from the rectifier. The base electrodes of the transistors 120, 122 are both connected to a reference voltage provided at a junction 123. The collector-emitter circuits of the transistors 120, 122 are connected in parallel between the rectifier and the output terminal 110. The transistor 120 is an NPN transistor which provides for primary regulation of the output voltage from the rectifier while the PNP transistor 122 functions to diminish positive going ripple voltages which would otherwise be passed through the collector-emitter circuit of the transistor 120.

The reference voltage at the junction 123 is controlled by transistors 124, 126 and associated circuitry. The transistor 126 is connected to function as a Zener diode and provides a constant voltage at the emitter of the NPN transistor 124. The base of the transistor 124 is connected to a potentiometer 130 which in turn forms part of a resistance network across the output of the voltage regulator circuit. The junction 123 is connected between the collector of the transistor 124 and series connected resistors 131, 132. The voltage level at the junction 123 is therefore determined by the voltage drop across the resistors 131, 132 and the voltage drop across the transistors 124, 126. The potentiometer 130 is adjusted to control the conductivity of the transistors 124, 126 and hence its adjustment determines the voltage at the junction 123 and the output voltage of the power supply under normal operating conditions of the system.

If the current load on the power supply is substantially increased, for example, by a short circuit or other equivalent malfunction, the power supply output current and voltage is substantially diminished and the control system is disabled. This is accomplished by operation of an NPN load sensing transistor 133 which has its base and emitter electrodes connected across a resistor 134 which is connected between the output terminal 110 and the emitter of the transistor 120. When the current load is substantially increased, current through the resistor 134 is substantially increased which in turn causes the transistor 133 to turn on. The collector of the transistor 133 is connected between the resistors 131, 132 and to the emitter of the transistor 122. Accordingly, conduction of the transistor 133 shunts the resistor 132 and the transistors 124, 126 so that the voltage at the junction 123 is reduced. This reduces the voltage level at the base of the transistor 120 so that the transistor 120 tends to turn off. Conduction of the transistor 133 also starves the emitter-collector circuit of the transistor 122 so that both the transistors 120, 122 are cut off or permitted to conduct only a limited amount of current. The voltage drop across the resistor 131 and the transistor 133 is relatively large so that when the transistor 133 is conductive the output current from the power supply is substantially reduced.

The substantial reduction in the output voltage from the power supply due to the increased current load disables the control system so that the presence of a malfunction is readily apparent. Furthermore, when the malfunctioning component is disconnected from the power supply, the power supply output voltage immediately increases to its normal level thus enabling the source of the malfunction to be quickly isolated for servicing or replacement.

The controller units in the preferred embodiment operate relay contacts which in turn control solenoid actuators associated with the heating and cooling equipment. The solenoid actuators are connected to the A.C. power supply 103 for the control circuitry and when switched on often have a high inrush current. This inrush current may cause a momentary collapse of the A.C. supply voltage. To prevent this voltage collapse from adversely effecting the control circuitry, a capacitor 136 is connected across the power supply terminals 110, 112. The capacitor 136 stores current so that when the voltage collapse occurs the capacitor supplies adequate current to operate the control circuitry until the A.C. power supply voltage is restored. A diode 137 is connected between the regulating circuitry 108 and the capacitor 136 to prevent the capacitor 136 from discharging through the regulating circuitry 108.

THE ZONE SENSING UNITS

The zone sensing units produce temperature responsive D.C. analog command signals each of which is transmitted to the assembly 66. The zone sensing units 60, 62, 64 are each substantially identical and each includes a duct air temperature sensor 70, a zone air temperature sensor 72, a temperature set point adjustment element 74 and an amplifier 76 (see FIG. 1). The sensors 70, 72 and set point adjustment element 74 each produce analog temperature responsive voltage signals which are algebraically combined and applied to the input of the amplifier 76. The amplifier 76 is preferably a linear amplifier which produces an output or command voltage signal from the zone which is proportional to the input signal. The output signal from the amplifier 76 is transmitted to the control assembly 66.

The zone sensing units 60, 62, 64 are preferably all the same and are substantially similar to the circuitry which is disclosed in the cross referenced application to Attridge. The zone sensing units differ from those in the cross referenced application in that the output or command signal from the amplifier of each unit preferably varies between 2 and 22 volts positive relative to the reference voltage at the power supply terminal 112.

Each amplifier 76 includes an output stage 76a comprising emitter follower connected transistors 142, 144 which are employed to reduce the output impedance of the amplifier as well as to provide increased command signal current from the zone sensor units. This construction is preferred since the control assembly 66 may be located remote from the zone sensing units and these may be connected by long leads. Furthermore, the low impedance signals transmitted to the control assembly from the zone sensing units resists antenna pickup of electrical noise which might otherwise occur with a high impedance signal.

The emitters of the transistors 142, 144 are connected to a zone sensor output terminal 146. The outputs 146 of the zone sensor units 60, 62, 64 are connected to the logic circuitry 94 in the control housing 66 via conductors 162–164, respectively, to provide separate inputs to the logic circuitry.

The zone sensing units 60, 62, 64 are preferably constructed using solid state integrated circuit elements which can be damaged if the connections between these units and the power supply output terminals 110, 112 are reversed. To prevent damage to the zone sensing units and enable prompt discovery of the improper wiring, diodes 165 are connected across the inputs of the zone sensing units. When a zone sensing unit is properly connected to the power supply terminals 110, 112, as is shown in FIG. 3, the diodes 165 are reverse biased and nonconducting. When the connections between any of the zone sensing units and the power supply terminals are inadvertently reversed, the diode 165 associated with that zone sensing unit becomes forwardly biased and conducts. Conduction of any of the diodes 165 shunts the associated zone sensing unit and obviates the possibility of damage to the zone sensing circuitry which might occur due to the reverse polarity connection to the power supply terminals.

Moreover conduction of a diode 165 creates, in effect, a short circuit across the power supply output terminals 110, 112. This reduction in current load on the power supply reduces the power supply output, as described above, and prevents operation of the control system. The existance of one or more improperly connected zone sensing units is thus readily apparent to the equipment installer. At this juncture the zone sensing units are disconnected from the power supply one at a time until the power supply output is restored to its operating level indicating that the improperly wired zone sensing unit has been disconnected. The undamaged zone sensing unit can then be properly reconnected to the power supply.

THE LOGIC CIRCUITRY

The logic circuitry 94 has two output conductors 166, 168 and enables the maximum and minimum command signals from the zone sensing units to be continuously transmitted to the output conductors 168, 166, respectively. The output conductor 166 is connected to the primary heater controllers 80–83 and to the secondary cooler controller 92. The output conductor 168 is connected to the primary cooler controllers 85–87 and to the secondary heater controller 90.

The maximum command signal level is produced by the zone sensing unit in the zone having the highest temperatures. As shown in FIG. 3 the logic circuitry includes diodes 170, 172, 174 which have their respective anodes connected to the conductors 162–164. The cathodes of the diodes 170, 172, 174 are all connected to the output conductor 168 of the logic circuitry. The conductor 168 is connected to the power supply terminal 112 through a resistor 178 so that the minimum voltage level which could be produced at the output terminal 168 is approximately two volts above the level of the power supply terminal 112.

The voltage level at the output terminal 168 is always substantially the same as the maximum command signal voltage level produced by any one of the zone sensing units. For example, referring to FIG. 3, if the command signal voltage at the output terminal 146 of the sensing unit 60 for zone 1 is more positive than the command signals from the remaining zone sensing units, the command signal voltage from the zone 1 sensing unit is applied across the output terminal 146 of the zone sensing unit and the power supply terminal 112, through the conductor 162, the diode 170, the output conductor 168 of the logic circuit and the resistor 178. Since the command signal from the zone 1 sensing unit 60 is greater, i.e. more positive, than the command signals from the sensor units 62, 64, the diodes 172, 174 are biased to nonconductive conditions and the command signal from the zone sensing unit 60 is supplied to the controllers 85–87 and 90 without being affected by the command signals produced by the units 62, 64.

If one of the other zone sensing units produces a greater command signal than that of the sensor unit 60, the command signal from that zone sensing unit is provided at the output terminal 168 and the cooling controllers 85–87 and the heater controller 90 are controlled by that command signal.

The minimum command voltage signal, i.e. the least positive signal, is produced by the zone sensing unit in the coolest zone and this signal is continuously applied to the heater controllers 80–83 and the secondary cooling controller 92. The logic circuitry 94 includes diodes 180, 182, 184 which have their cathode electrodes connected to the respective conductors 162–164. The anode electrodes of each of the diodes 180, 182, 184 are connected together at the output conductor 166 of the logic circuitry. The output conductor 166 is connected to the heater controllers 80–83 and the secondary cooling controller 92 and is also connected to the power supply terminal 110 through a resistor 188. The diodes 180, 182, 184 enable the lowest magnitude command signal from the zone sensor units to be continuously applied to the controllers 80–83 and 92. For example, if the zone sensing unit 60 provides the lowest of minimum command signal, current flows from the output conductor 166 of the logic circuitry through the diode 180, the conductor 162, the output conductor 146 of the sensing unit 60, the transistor 144 and to the power supply terminal 112. The remaining diodes 182, 184 are reverse biased and nonconductive since the voltages at their cathode electrodes are greater than the voltage at their anode electrodes.

This low level signal is continuously applied to the heater controllers and secondary cooler controller. Should another of the zones become cooler than zone 1, the output or command signal from the coolest zone sensing unit would become the low voltage level at the output conductor 166 and the diode 180 of the zone 1 sensing unit would be reverse biased.

THE CONTROLLER UNITS

The refrigeration unit controllers 85–87 are all voltage responsive devices which are individually operated to operate the associated refrigeration units at preselected command signal levels. The controllers 85–87 are preferably identical and accordingly only the controller 85 is illustrated and described in detail.

The controller 85 comprises a differential amplifier including transistors 190, 192. The base of the transistor 192 is connected to a resistance network which is adjusted so that the transistor 192 is normally in a conductive state when the maximum command signal voltage is below a preselected level. Conduction of the transistor 192 maintains the transistor 190 in a nonconductive state. When the command signal voltages from the output terminal 168 of the logic circuitry 94 rises to the preselected level, the transistor 190 becomes conductive and cuts off conduction of the transistor 192. A feedback resistor 193 is connected between the collector of the transistor 192 and the base of the transistor 190 to increase the abruptness of the switching action of the transistors 190, 192.

The transistor 190 has its collector electrode connected to the power supply terminal 110 through a relay coil 194 so that when the transistor 190 conducts, the relay coil 194 is energized and the relay contacts controlling the associated refrigeration unit are closed to initiate operation of the refrigeration unit.

The base of the transistor 190 is connected to the output junction of a high impedance voltage divider comprised of resistors 195a, 195b. The high impedance input to the transistor 190 assure that the controller unit 85 draws minimal command signal current.

The controller unit 85 is bistable so that the associated refrigeration unit remains energized as command signal levels are reduced below the predetermined level. This function enables the zones to cool down sufficiently to avoid rapid cycling of the refrigeration units. For example, if the controller 85 is operated at a command voltage level of 17 volts, it may cease to operate 14 or 15 volts.

The controller units 86, 87 are constructed to energize their associated refrigeration units at progressively higher command voltage levels so that staging of the refrigeration units is accomplished in accordance with demand for zone cooling. The units 86, 87, like the unit 85, have high input impedance, are bistable and remain energized as command voltages fall below their actuating levels.

Another important feature of the controller units 85–87 and 90 resides in the fact that they are "failsafe" in operation. That is, if the zone sensing units are for some reason disconnected from the logic circuitry, the absence of any command signal results in the refrigeration units and secondary heater being deactivated. This function is assured due to the connection of the conductor 168 to the power supply terminal 112 through the resistor 178 which maintains the voltage level at the inputs of the controller units 85–87 and 90 at about the set point level so that none of the controllers 85–87 and 90 can be activated. It should be pointed out that the resistor 178 permits the command voltage level to be reduced well below the set point level when one or more zone sensing units are connected to the logic circuitry due to the conduction of the amplifier output stages 76a which tend to shunt the resistor 178.

The heater controllers are voltage responsive devices which are individually operated in response to preselected command voltage levels. The heater controllers 80–83 are all the same and accordingly only the controller 80 is illustrated and described. The controller 80 comprises a differential amplifier consisting of transistors 196, 198. The transistor 198 is normally conductive at command signal voltage levels greater than a preselected level and the transistor 196 is cut off. When the lowest command voltage level reaches the preselected low level, the transistor 196 becomes conductive and cuts off conduction of the transistor 198. The transistor 196 has its collector electrode connected to the power supply terminal 112 through a relay coil 200. Thus, conduction of the transistor 196 energizes the relay coil 200 to close the contacts of the associated heater unit and energize the heater.

A feedback resistor 202 is connected between the collector of the transistor 198 and the base of the transistor 196 to facilitate abrupt switching action between these transistors. The base of the transistor 196 is connected to the output junction of a high impedance voltage divider formed by resistors 204a, 204b. This high impedance divider assures that the controller 80 draws minimal command signal current.

The controller unit 80 is bistable in operation so that the associated heater remains energized after the command voltage rises above the predetermined level at which the heater is energized. For example where the controller is actuated at a command signal level of about 8 volts, it may be deactuated at 10 volts.

The heater controllers 81–83 are constructed to respond to different low level command voltage signals so that staging of the heaters is provided. These controllers are also bistable in operation.

The controllers 80–83 and 92 are "failsafe" like the controllers 85–87 and 90 in that none of these controllers can be activated when the zone sensing units are disconnected from the logic circuitry. The inputs to the controller units 80–83 and 92 are connected to the positive power supply terminal 110 through the resistor 188 which maintains the voltage level at the conductor 166 at or near the set point voltage level should the zone sensing units be disconnected from the logic circuitry. Hence, none of the controllers 80–83 and 92 can be activated. When the zone sensing units are connected to the logic circuitry, the resistor 188 is shunted by the amplifier output stages 76a to enable the command voltage at the inputs of the controllers 80–83 and 90 to increase above the set point level.

The secondary heater and cooler controllers 90, 92 can be of the on-off type like the controllers 80, 85, respectively. For example, if the secondary heater 90 is a resistance heater the secondary heater controller 90 may be substantially identical to the heater controller 80 except, of course, that the command voltage level to which the controller 90 responds is of greater magnitude than the level responded to by the controller 80. The secondary cooler controller 92 is substantially the same as the refrigeration controller 85 except that it is operated at a lower voltage level than the controller 85.

In installations where modulating the secondary heaters or coolers is preferable, the controllers 90, 92 can be of a modulating or proportional type. Circuitry for varying the position of a valve to modulate flow of heating or cooling fluid in response to a command signal is illustrated and described in the above-referenced application of Attridge.

The fact that the controller units are voltage responsive is important because the individual controllers draw minimal amounts of command signal current. This enables the use of one or several stages of heating and/or cooling controllers without requiring circuitry to compensate for changes in the command signal which would be occasioned if the controllers drew any appreciable amounts of command signal current.

THE DAMPER UNITS

The preferred system is a constant volume system, i.e. a system in which the volume flow rate of air to each zone remains substantially constant at all times during the operation of the system. In order to maintain the flow rates to each zone constant, zone dampers in the hot and cold air ducts extending to each zone are connected to a common damper actuator so that movement of the zone dampers is correlated. For example, referring to FIG. 1 the zone dampers 48a, 48b controlling the flow of air to zone 1 are each operated by a damper actuator 48c. The damper actuator 48c is controlled from the command signal from the zone 1 sensing unit 60 so that the dampers 48a, 48b are positioned according to the command signal levels produced by the zone 1 sensing unit.

As shown in FIG. 2 the command signal from the zone sensing unit 60 is transmitted to an actuator controlling circuit 96, shown schematically, which operates the actuator 48c in proportion to the command signal. The actuator controlling circuit is connected across the A.C. power supply 103 and has its input connected to the output of the zone sensing unit 60. An output of the circuit 96 is connected to the actuator 48c. The circuit 96 produces an output for operating the actuator 48c which is proportional to the command signal voltage level produced by the zone sensing unit 60. The circuit 96 has a high input impedance so that little command signal current is drawn by it. The actuator controlling circuit may be of any suitable or conventional construction and is therefore not shown in detail. This circuitry can be constructed, for example, similarly to the refrigeration modulating control circuit disclosed in the cross referenced application of Attridge.

The actuator 48c is preferably hydraulically operated in response to the output from the circuit 96. In the preferred construction, the actuator 48c comprises a constantly operating hydraulic pump which supplies hydraulic fluid to a piston-cylinder type operator. Hydraulic fluid is variably bypassed around the cylinder by a thermally operated valve which governs the fluid pressure in the cylinder according to its position. The valve is operated by a heat motor energized by the output from the circuit 96.

The piston of the operator is drivingly connected to the dampers 48a, 48b and is biased toward a position wherein the hot air damper is opened and the cool air damper is closed. The fluid pressure in the cylinder overcomes the bias on the piston to move the dampers toward the positions in which the cool air damper is opened and the hot air damper is closed.

The actuator is illustrated and described in more detail in the cross referenced application of Brooks et al. to which reference may be made for a more detailed description.

When the zone sensing unit 60 produces a command signal indicating that zone 1 is at the set point temperature level (12 volts), the circuit 96 conditions the actuator 48c so that the dampers 48a, 48b are each open halfway. Thus half of the air flowing to zone 1 passes through the air cooling heat exchanger and the other half of the air flowing to the zone passes through the air heating heat exchanger. The air heating and air cooling equipment may or may not be functioning, depending on conditions sensed in the other zones, when the sensed air in zone 1 is at the set point level.

Figure 4:
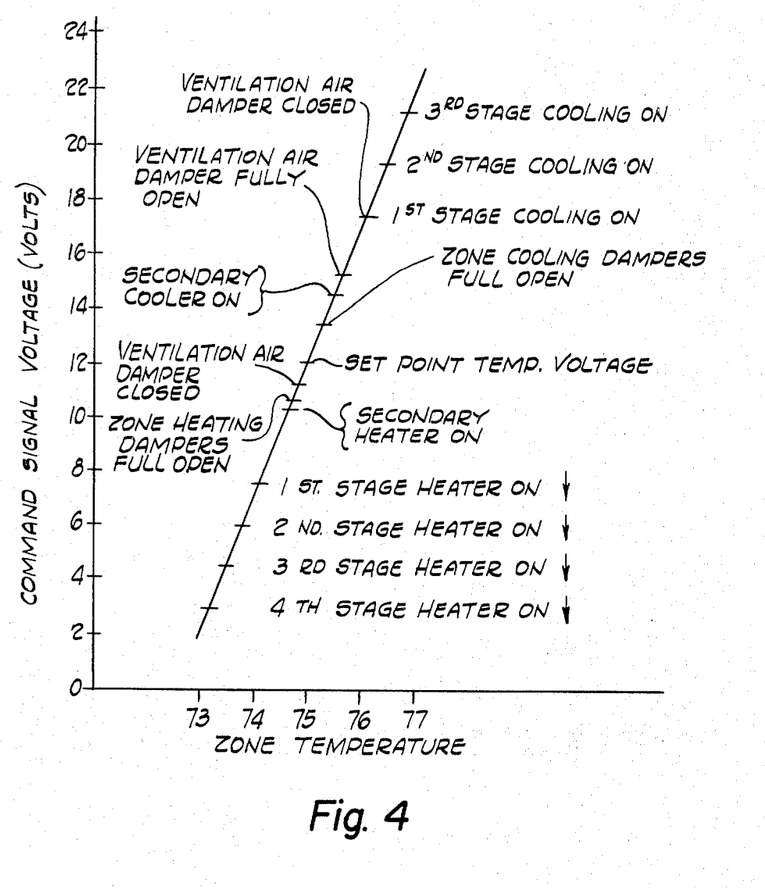

As the zone 1 air temperature decreases from the set point level the command signal is reduced resulting in the cold air damper 48a being moved toward its closed position and the hot air damper 48b moving toward its fully open position. The movement of the dampers 48a, 48b is correlated so that the volume of air flow rate to zone 1 remains substantially constant. For example, when the cooling damper 48a is at its one quarter open position the heater damper is at a three quarters open position. When the command signal from the zone 1 sensing unit is at a level indicating that the air temperature in zone 1 is about 85 percent of the set point level, e.g. when the command signal level is at about 10.5 volts, the cooling damper 48a is fully closed and the heating damper 48b is fully open (FIG. 4).

When the zone 1 temperature increases above the set point level, indicating an increased cooling load on zone 1, the cooling damper 48a moves toward its fully open position while the heating damper 48b moves correspondingly toward its closed position. When the zone 1 air temperature is about 15 percent above the set point temperature, the zone 1 command signal is at about 13.5 volts and the cooling damper 48a is fully open with the heating damper 48b fully closed (FIG. 4).

It should be noted that the range of command signal voltages through which the dampers 48a, 48b is modulated can be shifted relative to the set point voltage level by, for example, changing the input impedance of the circuit 96. This may be desirable where the zone associated with the dampers 48a, 48b has an inherently high internal heating load. In such a case the range of command signals to which the actuator 48c responds is shifted so that the cool air damper is fully open at or even below the set point voltage level.

The damper units 49 and 50 are associated with the zone 2 and zone 3 sensing units, respectively, and are constructed and operate the same as the damper unit 48. The unit 49 comprises cold and hot air dampers 49a, 49b, a damper actuator 49c and an actuator controlling circuit 98. The unit 50 comprises cold and hot air dampers 50a, 50b, a damper actuator 50c and an actuator control circuit 100. Since the damper units are connected to their respective zone unit outputs 146, operation of the damper unit for each zone is independent of the operation of damper units of the other zones and is not effected by operation of the zone sensing units of the other zones.

The volume flow rate of air passing through the blower is maintained constant by coordinated movement of the ventilation and return air dampers primarily controlled by the command signal from the warmest zone. The damper actuator 52 is drivingly connected to both the return air damper 34 and the ventilation air damper 32. Operation of the actuator 52 is governed by the damper controller circuit 100 which is connected across the A.C. power supply 103 and has its input connected to the output conductor 168 of the logic circuitry (FIG. 2). The actuator 52 and circuit 100 are of the same construction as is described above in reference to the actuator 48c and circuit 96.

The circuit 100 governs operation of the actuator 52 in response to the command signal voltage level from the warmest one of the zones. When the warmest zone temperature is at a predetermined level below the set point temperature level, as will occur when outside air temperatures are low, the actuator 52 positions the dampers 32, 34 so that the ventilation air damper is closed, or in a minimum flow position, and the return air damper is fully open. This enables the air heating units to operate at maximum effectiveness since they are not required to heat the relatively low temperature outside air.

As the temperature of the warmest zone increases toward the set point temperature, the damper controller circuit 100 operates the damper actuator 52 to open the ventilation damper 34 while simultaneously moving the return air damper toward its closed position. These damper movements are proportional to the command signal level from the warmest zone. As noted, the damper movements are correlated so that the volume flow rate of air in the system remains constant.

When the air temperature in the warmest zone increases above the set point temperature level, the dampers 32, 34 are positioned so that the volume of ventilation air flowing into the system is greater than the return air volume. The ventilation air tends to cool the zones. The return air which is not recirculated is exhausted from the system into atmosphere via a suitable exhaust duct, not shown.

When the air temperature in the warmest zone reaches a predetermined level above the set point temperature the ventilation air damper 32 is fully open and the return air damper 34 is closed. This provides a maximum cooling effect from the atmospheric air. In this condition all of the air which has passed through the zones is exhausted to atmosphere from the system.

As is shown in FIG. 4, the range of command voltage levels throughout which the actuator 52 is operated to modulate the proportions of ventilation and return air is disposed relative to the set point voltage level so that the ventilation damper 32 is at its closed or substantially closed position when the command signal from the warmest zone is at about 11 volts, i.e. just below the set point voltage level. This range of operation is desirable because in most cases the zones will all have internal heat sources (e.g. people, machines, etc.) which heat the recirculated air so that the recirculating air thus tends to heat the zones itself. For this reason, the flow of ventilation air is reduced promptly when all zones are below the set point temperature.

When atmospheric air temperature is too high to satisfy the cooling load on the zones, the air cooling equipment is operated and it is usually undesirable to maintain the ventilation damper 32 fully open since the effectiveness of the air cooling units is reduced where air in the system is not recirculated. Accordingly the damper actuator 52 is operated to close, or substantially close the damper 32 and open the damper 34 so that when the air cooling units operate, the air in the system is composed at least primarily of recirculated air.

In the illustrated embodiment (FIG. 2) the controller unit 85 for the first stage of the cooling equipment operates single throw double pole relay contacts 210 which, when the controller 85 is not activated, connect the input of the damper controller circuit 100 to the logic circuit output conductor 168. When the controller 85 is activated to operate the first stage cooling equipment the contacts 210 are operated to disconnect the input of the damper controller circuit 210 from the conductor 168 and to connect the input of the controller 100 to the low voltage terminal 112 of the power supply. The resultant low voltage level at the input of the controller circuit 100 causes the damper actuator 52 to close the ventilation damper 32 and fully open the return damper 34 so that the air in the system is recirculated.

Whenever the controller 85 is deactivated, the contacts 210 again connect the input of the damper controller circuit 100 to the command signal on the conductor 168 so that the positions of the dampers 32, 34 are again governed by the sensed air temperature in the warmest zone.

Although the contacts 210 are illustrated as being operated by the controller 85, other constructions can be used. For example, the contacts 210 can be replaced by a single throw double pole snap acting switch operated by a thermal power element, not shown, which senses atmospheric air temperature or the temperature of air entering or leaving the blower 22. When the sensed air temperature reaches a predetermined high level, the snap switch is operated to connect the input of the circuit 100 to the low voltage power supply terminal 112 to effect closing of the ventilation air damper 32 and recirculation of the air in the system.

While a single preferred embodiment of the invention has been illustrated and described, the invention is not to be considered limited to the precise construction disclosed. It is intended that all adaptations, modifications and uses of the invention falling within the scope of the appended claims be covered.

What is claimed is:

1. An air conditioning control system comprising:
    a. a plurality of air conditioned zones;
    b. air heating means comprising at least a primary air heating unit and a secondary air heating unit;
    c. air directing means for delivering heated air from said air heating means to said zones;
    d. zone temperature sensing means in each zone for producing a D.C. analog signal having a magnitude dependent upon sensed zone air temperature;
    e. first controller means for operating said primary air heating unit;
    f. second controller means for operating said secondary air heating unit; and,
    g. logic circuitry connected between said sensing means and said controller means for transmitting the signal from the coolest zone to said first controller means while transmitting the signal from the warmest of said zones to said secondary controller means.

2. The system claimed in claim 1 wherein said first and second controller means comprise signal voltage level responsive circuits.

3. The system claimed in claim 1 wherein said logic circuitry comprises:
    1. a first plurality of diodes, each diode having an anode connected to a respective zone temperature sensing means and the cathodes of said diodes connected together and to one of said first and second controller means; and,
    2. a second plurality of diodes, each diode of said second plurality having a cathode connected to a respective zone temperature sensing means and the anodes of said diodes connected together and to the other of said first and second controller means;

3. the diode of said first plurality of diodes connected to the zone temperature sensing means producing the most positive signal conducting to control operation of the associated controller means; and,
    4. the diode of said second plurality of diodes which is connected to the zone temperature sensing means producing the least positive signal conducting to control operation of the associated controller means.

4. The system claimed in claim 3 wherein said zone temperature sensing means comprise amplifiers effective to produce signals of one polarity throughout their range of operation, the magnitude of said signals varying in magnitude in dependence on sensed zone temperatures.

5. The system claimed in claim 4 further including a D.C. power supply defining first and second power output terminals connected to said zone temperature sensing means and said controller means, said power supply comprising current detecting means for reducing the power supply voltage in response to current flows greater than a predetermined flow to said zone temperature sensing means or said controller means.

6. A system as claimed in claim 5 and further including a capacitor connected across said power supply output terminals for supplying current flow greater than said predetermined current flow to said controller means for brief intervals without effecting a reduction in the power supply output voltage.

7. A system as claimed in claim 5 wherein each zone temperature sensing means further includes a diode connected across said power supply output terminals, said diode normally having its cathode connected to the positive terminal and its anode connected to the other output terminal whereby when said zone temperature sensing means are properly connected to said power supply said diodes are nonconductive, each of said diodes conducting to protect the associated zone temperature sensing means from damage when the zone temperature sensing is connected to the power supply so that the anode of said diode is connected to the positive output terminal and the cathode is connected to the other terminal.

8. In an air conditioning system comprising at least one air conditioned zone and air conditioning means for effecting heat transfer with air flowing to said at least one zone, a control system comprising:

a. a zone temperature sensing means comprising solid state circuitry for producing an electric analog signal which varies as a function of sensed temperature, said sensing means comprising first and second power input conductors;

b. a direct current power supply having first and second output terminals connected to said first and second power input conductors of said sensing means respectively, said power supply comprising circuitry for detecting increased current loads on said power supply and effective to reduce the power supply output in response to detection of increased current loads; and, c. a diode connected between said first and second power input conductors across said first and second output terminals, said diode being normally nonconductive when said zone sensing means is properly connected to said power supply, said diode rendered conductive when said second and first input conductors are connected to said first and second output terminals respectively, whereby the output of said power supply is reduced.

* * * * *